Nov. 22, 1960

E. OLSEN 2,961,155

PLATFORM READ-OUT

Filed Sept. 12, 1957

3 Sheets-Sheet 1

INVENTOR.

EARL OLSEN

BY Wallace P. Lamb

ATTORNEY

Nov. 22, 1960 E. OLSEN 2,961,155

PLATFORM READ-OUT

Filed Sept. 12, 1957 3 Sheets-Sheet 2

INVENTOR.
EARL OLSEN
BY Wallace P. Lamb
ATTORNEY

Nov. 22, 1960 E. OLSEN 2,961,155

PLATFORM READ-OUT

Filed Sept. 12, 1957 3 Sheets-Sheet 3

INVENTOR.
EARL OLSEN

BY Wallace P. Lamb

ATTORNEY

United States Patent Office 2,961,155

Patented Nov. 22, 1960

2,961,155

PLATFORM READ-OUT

Earl Olsen, Detroit, Mich., assignor to Burroughs Corporation, Detroit, Mich., a corporation of Michigan Filed Sept. 12, 1957, Ser. No. 683,576

11 Claims. (Cl. 235—60.28)

This invention relates generally to calculating machines and particularly to a read-out platform therefor.

One of the objects of the invention is to provide for calculating machines an improved read-out device of a character which will convert decimal input information from a calculating machine directly to binary output information for entry into another machine.

Another object of the invention is to provide a read-out platform having provisions for suppressing all zeros in digit orders higher than the highest significant digit.

More specifically, it is an object of the invention to provide a read-out platform having a plurality of laterally positioned switching units or sections of a character such that zeros will be printed in digit orders lower than the highest significant order, but not in digit orders higher than the highest significant order.

Other objects of the invention will become apparent from the following detailed description, taken in connection with the accompanying drawings in which.

Figure 1:
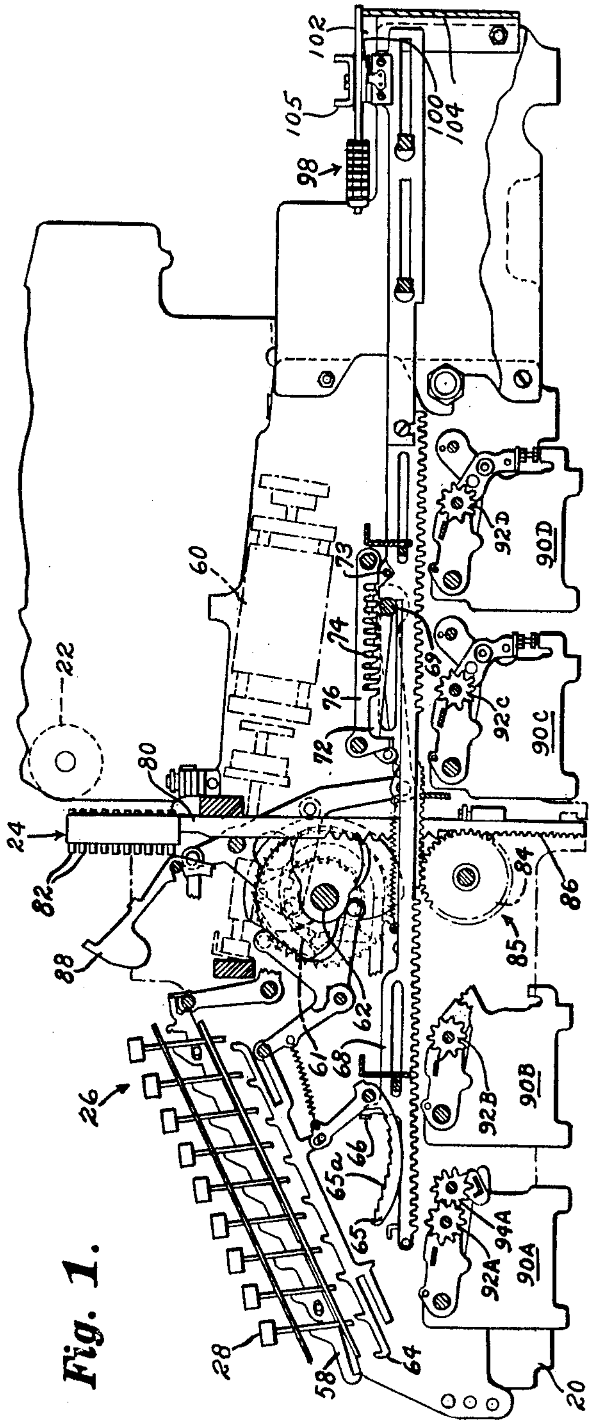
Fig. 1 is a side view of a calculating machine.
Figure 2:
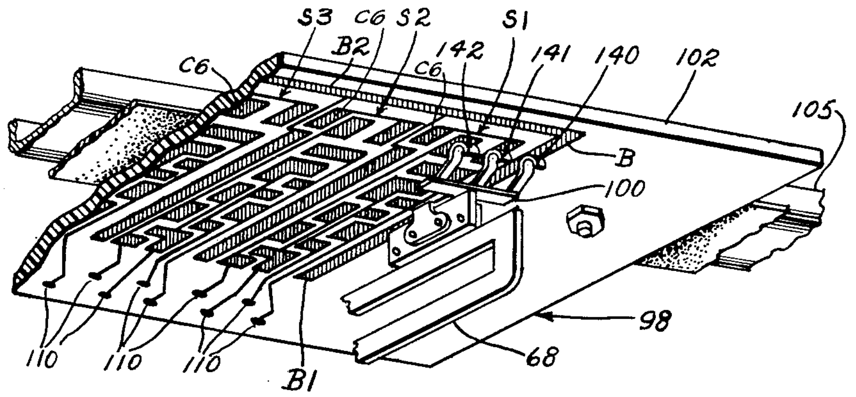
Fig. 2 is a fragmentary perspective view of certain parts of the calculating machine, shown removed therefrom.

Referring to the drawings by characters of reference, the calculating machine shown includes the usual base 20 on which is mounted a carriage (not shown) for a platen 22. Forwardly of and adjacent the platen 22 is a plurality of print units 24, of which only one is shown, and forwardly of the print unit 24 is a keyboard 26, of which there is shown a single columnar row of keys 28 that are operatively connected to the print unit 24. The row of keys 28 shown is a row of amount keys, and other keys of the board will, of course, include a key for initiating machine cycling or a so-called motor bar (not shown).

When one of the amount keys 28 is depressed, it is retained in that position by a keyboard locking slide 58 until the motor bar is depressed. Depression of the motor bar energizes the circuit of a motor 60 and also causes a drive clutch 61 to be engaged through which the motor 60 drives a main cam shaft 62. Rotation of cam shaft 62 moves an index strip 64 rearwardly of the machine, limited by the stem of the amount key depressed and also rotates an index or stop sector 65 clockwise into the path of an ear 66 on a horizontally reciprocal actuator or data rack 68. Continued rotation of the cam shaft 62 moves a bail 69 forwardly, which in turn moves the data rack 68 forwardly, limited by engagement with one of the stops 65A on the index sector 65 corresponding to the amount key depressed. When the data rack 68 is stopped by the index sector 65, the bail 69 cams a pawl or latch 72 on rack 68 to locate a stud 73 carried by the pawl into a tooth space 74 of a stationary lock plate 76 to lock the data rack 68 in its indexed position.

A vertically extending print bar 80 carries the print unit 24 and is operatively connected to the data rack 68 by a gear cluster 85 which includes a bull gear 84. The bull gear 84 meshes with rack teeth 86 on the lower edge of the print bar 80. Rotation of the bull gear 84 counterclockwise raises the print bar 80 a distance related to the movement of the data rack 68 and positions the selected type slug 82 in printing position. To the left of the print bar 80 is a pivoted hammer 88 which is arranged to drive the selected type slug 82 against the platen 22 to print the character. At a point of rotation of the main cam shaft 62, subsequent to termination of the forward movement of the data rack 68 and to the upward movement of the print bar 80, the hammer 88 is released, the arrangement being such that the rack 68 and bar 80 are in their respective key selected positions before the hammer 88 strikes the selected type slug 82. Following the printing operation, the data rack 68 and the type bar 80 are returned to their normal positions by the rearward movement of the bail 69, actuated from the main cam shaft 62.

In order to accumulate successive amounts entered into the machine, a plurality of accumulators or totalizing devices 90A, 90B, 90C and 90D are provided. Although four of such devices are shown in the present machine, it will be understood that one or more may be used. It will be noted that accumulator 90A is of the so-called crossfooter type, and the others are registers, but the accumulators may be of any desired type from which plus and minus totals and subtotals may be taken.

The accumulators 90A, 90B, 90C and 90D are not shown or described in detail as such devices are well known in the art and form no part of the present invention. In general, the crossfooter accumulator 90A includes two sets of pinions 92A and 94A and each of the registers 90B, 90C and 90D include a single set of similar pinions. In each of the devices, the pinions are mounted on rocker arms such that the pinions may be swung up respectively to engage the gear teeth of the data racks 68 to be moved thereby to positions corresponding to the amounts entered by the amount keys.

For a more detailed description of the calculating machine, reference may be had to the patent of Thomas M. Butler, No. 2,629,549.

Mounted on the base 20, adjacent the rear thereof is a switching device 98 to read-out information entered in the calculating machine so that the information may be entered into another machine, such as for example, a printing machine (not shown). The switching device includes a plurality of bridging contacts 100 that are carried respectively by the data racks 68, the contacts 100 being movable with the racks to selected positions in accordance with the information entered into the machine by the amount keys. Cooperable with the movable bridging contacts 100 is a so-called read-out platform 102 of a character adapted to convert information of a decimal input system directly to a binary read-out system.

Referring in detail to the read-out platform 102, this platform includes a support or board of electrical insulating material having on one surface thereof a plurality of individual units or sections of contacts S1 to S11. Of these contact sections, the sections S1 to S10 correspond to the number of horizontal rows of amount keys that are provided on the keyboard, and contact section S11 corresponds to a row of symbol keys. The contact sections S1 to S10 are preferably laterally positioned on the board 102 in a row in spaced relation longitudinally of the board or transversely of the machine, and these contact sections respectively correspond to orders of digits. For example, section S1 corresponds to the highest selectable digit order, the sections S9 and S10 being the lower, or specifically the cents order. As shown, the board 102 is mounted on the base 20 by a bracket 104 and clamp 105 with the contact sections S1 to S11 on the underside of the board and in alignment respectively with the rack carried bridging contacts 100.

As the contact sections S1 to S10 are substantially alike, only one of them is herein described in detail so as to avoid unnecessary repetitious description. With particular reference to the fragmentary diagrammatical view of Fig. 3, it will be seen that the contact section S1 comprises four sets or parallel paths or rows R1, R2, R3 and R4 of contacts, the contacts of each one of the rows being electrically connected in series by strip like conductors. These conductors are electrically connected respectively to four electrical utilization devices or solenoids T1, T2, T3 and T4, shown diagrammatically in Figs. 3 and 6. Four of such controls T1, T2, T3 and T4 are provided for each of the contact sections S1 to S11 and are respectively connected to the rows of contacts R1 to R4. The contacts of R1, are designated C1 to C3, the contacts of R2 are C4 and C5, the contacts of R3 are C6, C7 and C8, and the contacts of R4 are C9 and C10.

Transversely of the contact rows R1 to R4, the contacts C1 to C10 are arranged in a pattern which presents ten possible contact bridging positions for the bridging contact 100. These positions are transversely of the rows of contacts and designated by the numerals 0 to 9 respectively. The specific pattern of contacts C1 to C10 is determined by the selected 10 decimal positions 0 to 9 and by the number of rows of contacts, in this instance the four rows R1, R2, R3 and R4. Permutations of "4" and the requirement of ten switching positions determine in the present instance, an arrangement of the contacts C1 to C10 such that the bridging contact 100 may bridge one, or various combinations of two contacts of different sets of contacts in the digit range of "0" to "9" of the binary system.

A bus B is provided on the same surface of the board 102 as the contact sections S1 to S11 and is connetced to a source of potential, the bus having a leg B1 extending parallel along and adjacent the row of contacts R1 beyond the zero position and having a leg B2 extending longitudinally of the board adjacent the zero positions to supply current to all of the sections S1 to S11. A branch bus B3 extends between each one of adjacent pairs of the contact sections S1 to S10, these branch buses being connected by leads 106 to the main bus leg B2. As shown, the branch buses B3 terminate at the "1" and "9" positions except those of S9, S10 and S11. For each one of adjacent pair of the contact sections S1 to S7 is provided a fixed bridging contact 108 which is located in the zero positions of the bridging contacts 100 to function, as will later be seen, in effecting zero suppression except in digit orders lower than the highest significant order. It will be noted that the contact 108 is not connected electrically with any of the contacts of the rows R1, R2, R3 and R4. In their normal positions, the bridging contacts 100 respectively bridge the contacts C6, 108 and the bus leg B1, thus serially connecting the zero position contacts of each of the contact sections S1 to S8 to the bus B through contacts 108 (see Fig. 4). The cents sections S9 and S10 and the symbol section S11, have the branch buses connected directly to the bus leg B2 since zero suppression is not required in these sections.

Figure 3:
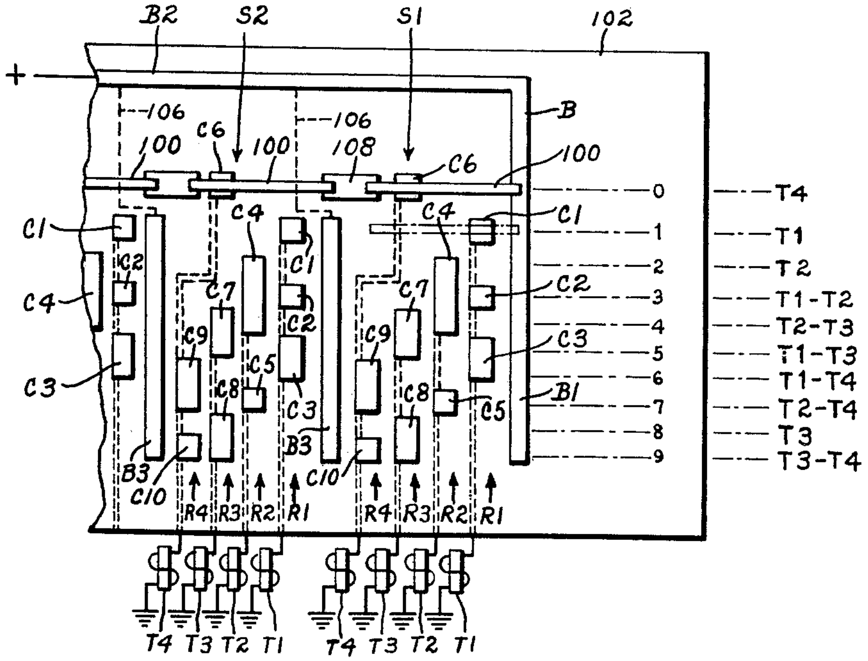
Fig. 3 is a fragmentary diagrammatic view of a read-out platform embodying features of the invention.
Figures 4, 5, 6:
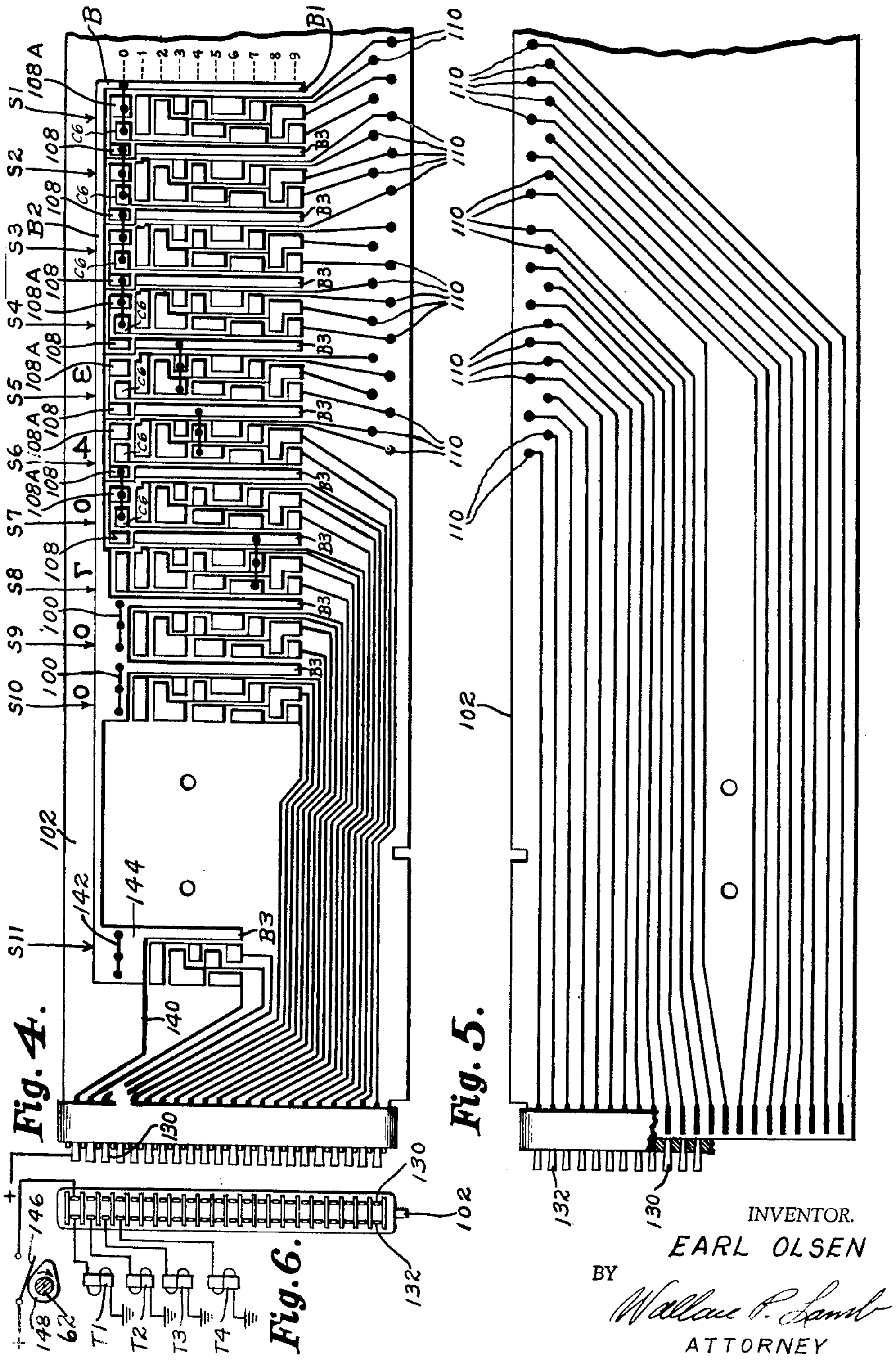
Fig. 4 is a bottom view of the read-out platform.
Fig. 5 is a top view of the read-out platform.
Fig. 6 is an end view of the read-out platform.

Referring now to Figs. 4 and 5 which show opposite sides of the read-out board 102, it will be seen that instead of the diagrammatical arrangement of Fig. 3, the contacts of the sections S1 to S11 are arranged so that the widths of the sections need be no greater than necessary. To this end, some of the contacts have projections or are L-shaped and arranged such that the projections extend into complementary off-sets in adjacent sets of contacts. This arrangement of the contacts reduces the number of paths of contacts from the four paths or rows illustrated in Fig. 3 to two paths of interspersed contacts to effect an appreciable saving of space so that the data racks and associated mechanism may be also positioned correspondingly close together. Also in the zero positions, the contact 108 is made in two parts including the part 108A, the parts being electrically connected together by a conductor, as shown. This arrangement allows the "0" position contact C6 to be located in the same path with contacts C9 and C10 (see Figs. 3 and 4). In order to have the contacts interspersed in two paths of contacts, the bridging contact 100 is provided with three electrically connected fingers 140, 141, and 142. Contact finger 140 rides on, and continuously engages the bus leg B1, and contact fingers 141 and 142 are arranged to respectively traverse the two paths of contacts and assume one of the positions to bridge the corresponding contacts to the bus. As indicated, the contact fingers 140, 141 and 142 are preferably spring fingers to insure proper engagement with the read-out contacts.

The conductors leading from the sets of contacts of sections S1 to S5 pass through the board 102, through conductor plugs 110 therein and extend longitudinally of the board to connect respectively to plug-in terminals 132 which may be arranged in a row on one end of the board 102. From the other contact sections S6 to S11, conductors extend on the other side of the board 102 respectively to a plurality of plug-in terminals 130 which are arranged in a row opposite terminals 132. To one of the end terminals 130 is connected the bus B by a conductor 140.

As previously mentioned, the normal positions of the bridging contacts 100 are the zero positions. In such positions, the zero contacts of the several sections S1 to S8 are electrically connected serially to the bus B by reason of the fixed bridging contacts 108, and to the output terminals 130, 132 by reason of the bridging contacts 100 bridging contacts C6 to the bus. As a result, the solenoid T4 of each bank of four solenoids is energized. However, the system is such that when solenoids T4 are energized they act to prevent the printing of the zeros. In this connection, it is to be understood that the printing machine (not shown) may be of any suitable type adapted to be electrically connected to the solenoids T1, T2, T3 and T4 and have zero printing, blocking or other well known disabling means responsive to energization of solenoid T4. By this arrangement, whenever one of the bridging contacts 100 is positioned in any of the other bridging positions from 1 to 9, with the exception of sections 8 to 11, the circuit through the zero contacts is broken with the result that zero may be printed in orders lower than the highest significant digit.

The section S11, or symbol section, is similar to the previously described contact sections in that it has a plurality of contacts arranged on the board 102 to provide a number of potential bridging positions for a bridging contact 142. Normally, the bridging contact 142 is positioned such that its three contact fingers are engaging an enlarged surface 144 of the bus B, as shown in Fig. 4. From its normal position, the bridging contact 142 is movable, by pressing the desired symbol key, to the corresponding contact bridging position to effect a read-out of the desired symbol.

In the power line is a normally open switch 146, Fig. 6 which is closed by a cam 148 on the cam shaft 62 of the calculating machine. The cam 148 is designed in accordance with the maximum travel of the data racks 68 such that the switch 146 is not closed until after the bridging contacts 100 and 142 have reached the selected bridging contacts. Thus, the switch 146 controls energization of the bus B so that engagement of the contacts traversed by the bridging contacts enroute to the selected contacts does not energize the circuits of the non-selected contacts.

In operation of the machine, let it be assumed that the operator depresses the 3, 4 and 7 columnar amount keys to record the sum of "$3407.00." On depressing the motor bar, the corresponding data racks 68 are moved forwardly and position the bridging contacts 100 in corresponding positions on the read-out platform 102. As indicated in Fig. 4, the contact 100 of the S5 section will have been moved from its zero position to bridge the contacts of the "3" position and complete a circuit to the corresponding solenoids of T1 and T2 of the bank of solenoids corresponding to section S5. Similarly, the bridging contact 100 of the S6 section bridges the read-out contacts of the "4" position which energizes solenoids T2 and T3. Since the bridging contact of the S7 position remains in the zero position and since movement of bridging contact 100 of S6 broke the circuit with the adjacent fixed bridging contact 108, the solenoid T4 corresponding to the zero position of S7 will be de-energized, which means that the zero will be read-out. In the next section, or section S8, the bridging contact 100 will be in the seven position energizing T2 and T4 and read-out the "7," and, of course, the contacts 100 of the cents sections C9 and C10 will read-out the zeros called for. Also, it will be seen that although the movable bridging contact of S5 has moved from its zero position, the serial connection to the zero contacts of the higher digit orders remains unbroken at the common bridging contacts 108 thereof, with the result that no zeros in these higher orders will be read-out. In the diagrammatical view of Fig. 5, to the right of board 102 is a chart that indicates which of the solenoids T1, T2, T3 and T4 or combinations thereof that will be energized by movement of the bridging contact 100 to the various corresponding decimal positions.

From the foregoing description, it will now be understood that the invention provides a read-out board of a character which will convert decimal system information input to a calculating machine, directly to a binary system output for entry into other machines, such as for example, a printer. Further, it will be appreciated that the read-out platform embodies a simple, inexpensive zero suppression arrangement to avoid the reading out of all zeros in digit orders higher than the highest significant order. In addition, the read-out platform contacts are arranged and interspersed in paths to provide a compact path of travel for the movable bridging contacts with accompanying saving of space and avoidance of the need to adapt the calculating machine size to the read-out board.

While the invention has been shown and described in considerable detail, it will be understood that many variations thereof may be had without departing from the spirit and scope of the invention.

What is claimed is:

1. In a calculating machine read-out device, a supporting member, a bus on a surface of said supporting member, a contact on the surface of said member laterally spaced from said bus and corresponding to a zero digit of a relatively high order of digits, a second contact on said surface spaced from the first, a contact spaced from and common to both said first and second contacts, a movable bridging contact normally bridging said first contact and the common contact and bus, and a second movable bridging contact normally bridging said second contact and said common contact.

2. In a calculating machine read-out device, a supporting member, a bus on a surface of said supporting member, a pair of laterally positioned sections of switching units corresponding respectively to the highest digit order and the next lower digit order, each of said units having a set of contacts on the surface of said support with the contacts of each one of the units electrically connected together and arranged in accordance with a binary code providing ten potential bridging positions of various combinations of the contacts of each unit with said bus including a zero contact in each unit, a contact common to the zero positions of both groups of said contacts, and a movable bridging contact for each of said units, the bridging contact of said lower digit order normally bridging the zero contact thereof and said common contact, and the bridging contact of the highest digit order normally bridging the zero contact thereof, the common contact and said bus.

3. A calculating machine read-out platform comprising, a support, a plurality of sets of contacts fixed on a surface of said support, the contacts of each one of said sets serially connected together and interspersed providing a number of paths of the contacts less than the number of sets, said contacts arranged longitudinally of said rows in accordance with permutations of the number of the sets of contacts providing a plurality of bridging positions transversely of the paths of one or various combinations of two of the contacts of different paths, a bus extending along one of the paths, and a slidable bridging contact engaging said bus and movable along the paths to any one of said positions.

4. A calculating machine read-out platform comprising, a support, a plurality of sets of contacts fixed on a surface of said support, the contacts of each one of said sets of contacts serially connected together and interspersed providing a number of paths of the contacts of a lesser number than the number of sets of contacts, said contacts arranged longitudinally of the paths in accordance with permutations of the number of sets of contacts providing a plurality of bridging positions transversely of said paths of contacts of one or various combinations of two contacts of different paths of the contacts, a bus extending along one of the paths of contacts, and a slidable bridging contact carrying three electrically connected finger contacts positioned for travel respectively along and engaging the contacts of said paths of contacts and said bus.

5. The combination with a member differentially positionable to any one of ten decimal positions, of a source of potential; an electrical read-out device for directly converting the differential decimal positions of said member into a binary coded output, said read-out device including a supporting member having four electrically insulated sets of contacts each of which sets includes at least two electrically interconnected, spaced contacts, a bridging contact carried by said differentially positionable member and electrically connected to said potential source, said bridging contact engaging a different one of the contacts of a different one of said contact sets in certain mechanical positions of said differentially positionable member and a contact in each of two different sets of contacts in other mechanical positions of said differentially positionable member; and a plurality of electrical utilization devices each connected to a different one of said sets of contacts for selective energization therefrom individually and in pairs.

6. A calculating machine read-out device comprising, a supporting member, a plurality of sets of contacts mounted on a surface of said member and having the contacts of each set spaced apart and interspersed to form a number of laterally positioned paths of contacts less than the number of sets of contacts, said contacts of each set electrically connected together and the sets of contacts electrically insulated from each other, said contacts of each one of the sets of contacts arranged in relation to the contacts of the other sets in accordance with permutations of the number of sets used to effect a plurality of potential bridging positions longitudinally of said paths of interspersed contacts for bridging various combinations of one or more of said contacts, and a movable contact movable to any one of said positions.

7. A calculating machine read-out device comprising, a supporting member, a plurality of sets of contact members mounted on a surface of said supporting member with the contact members of each set electrically connected together and the sets of contact members insulated from each other, said contact members of each one of the sets arranged in relation to the contact members of the other sets in accordance with permutations of the number of sets used to effect a plurality of potential bridging positions to bridge various combinations of said contact members representing corresponding values, said contact members of each set spaced apart and interspersed to form a number of paths of contact members less than the number of sets of contact members and with the paths extending transverse to said bridging positions, and a contact member movable respectively along said paths to any one of said positions.

8. A calculating machine read-out device comprising, a supporting member, a bus mounted on a surface of said supporting member, a plurality of sets of spaced apart contact members mounted on the surface of said supporting member with the contact members of each set serially connected and the sets of contact members insulated from each other, the contact members of each set arranged in relation to the contact members of the other sets in accordance with permutations of the number of sets of contact members to provide ten different potential bridging positions of different combinations of said contact members representative of correspondingly different values, some of said contact members L-shaped and interspersed with other of said contact members forming a number of paths of contact members of different sets less than the number of sets with the paths extending longitudinally of said bus, and a contact member movable to any one of said bridging positions and contacting said bus.

9. In a calculating machine read-out device, a supporting member of electric insulating material, a contact member mounted on a surface of said supporting member and representing a zero digit of a relatively high order of digits, a second contact member mounted on the surface of said supporting member in spaced relation to the first contact member and representing a zero of the order next lower than the order of said first contact member, a contact member interposed between and common to said first and second contact members, a movable bridging contact member to bridge the first contact member and said common contact member, and a second movable bridging contact to bridge said second contact and said common contact.

10. In a calculating machine having selectively positionable members representative of digit orders, a supporting member of electric insulating material associated with said positionable members, a group of spaced contact members for each of said positionable members disposed on said supporting member and in an arrangement representative of digits 0 to 9, a plurality of contact members on said supporting member and respectively disposed between and common to adjacent pairs of zero contact members, a plurality of controls respectively connected electrically to said zero contact members and operable when deenergized to effect the recording of zeros, and a plurality of movable bridging contact members respectively for said groups of contact members and normally respectively bridging the zero contact members and the common contact members serially.

11. The combination with a member differentially positionable to any one of ten decimal positions of an electrical read-out device for directly converting the differential decimal positions of the differentially positionable member into a binary coded output, said read-out device including a supporting member having four electrically insulated sets of contacts, each of which sets includes at least two electrically interconnected spaced contacts, and a bridging contact movable in accordance with movement of the differentially positionable member, said bridging contact engaging a different one of the contacts of a different one of said contact sets in certain mechanical positions of the differentially positionable member and engaging a contact in each of two different sets of the contacts in other mechanical positions of said differentially positionable member.

References Cited in the file of this patent

UNITED STATES PATENTS

| | | |
|---|---|---|
| 2,318,591 | Couffignal | May 11, 1943 |
| 2,659,072 | Coales et al. | Nov. 10, 1953 |
| 2,701,357 | Newby | Feb. 1, 1955 |
| 2,767,907 | Schwend | Oct. 23, 1956 |
| 2,822,130 | Nolde et al. | Feb. 4, 1958 |

FOREIGN PATENTS

| | | |
|---|---|---|
| 707,283 | Great Britain | Apr. 14, 1954 |